L. H. CHAMBERLIN.
COMBINED SHOVEL AND SIFTER.
APPLICATION FILED DEC. 21, 1908.

945,754.

Patented Jan. 11, 1910.

Witnesses:

Inventor:
Louis H. Chamberlin
By
Attorney.

UNITED STATES PATENT OFFICE.

LOUIS H. CHAMBERLIN, OF CHICAGO, ILLINOIS.

COMBINED SHOVEL AND SIFTER.

945,754.  Specification of Letters Patent.  Patented Jan. 11, 1910.

Application filed December 21, 1908. Serial No. 468,506.

*To all whom it may concern:*

Be it known that I, LOUIS H. CHAMBERLIN, a citizen of the United States, residing at Chicago, county of Cook, and State of Illinois, have invented certain new and useful Improvements in a Combined Shovel and Sifter, of which the following is a specification.

My invention relates to combination implements, and more specifically to that class of the same known as combined shovel and sifter.

The object of my invention is to provide an implement of the character described adapted to efficiently act in the double capacity of an ash scoop or remover and an ash sifter.

A further object of my invention is to provide an implement of a nature as mentioned which will be strong and durable, simple of construction, hence of low cost to manufacture.

Other objects will appear hereinafter.

With these objects in view, my invention consists generally in a shovel of substantially ordinary design, to the upper edge of the scoop or blade portion whereof is secured a wire mesh or screen entirely covering the mouth thereof, one of the side walls of the scoop of said shovel being hingedly secured to the body portion thereof so as to facilitate the removal of the siftings from the scoop.

My invention further consists in certain details of construction and arrangement of parts all as will be hereinafter fully described and particularly pointed out in the claims.

Figure 1:
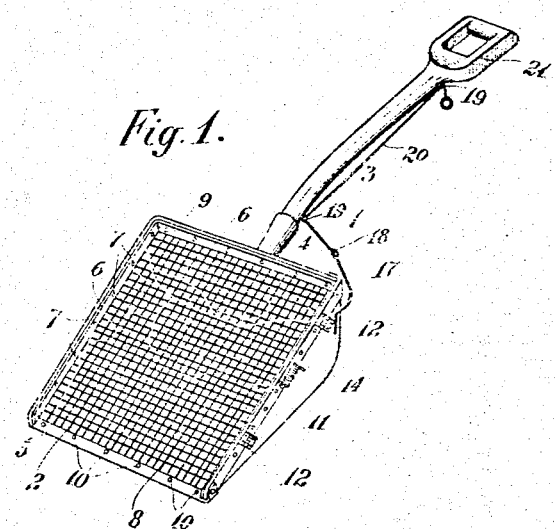
Figure 2:
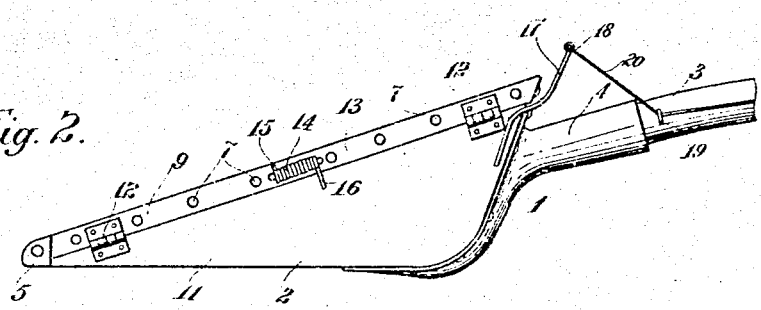
Figure 4:
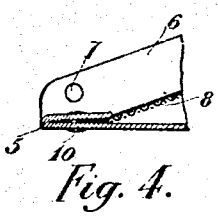
Figure 3:
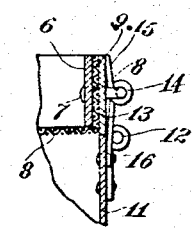

My invention will be more readily understood by reference to the accompanying drawings forming a part of this specification, and in which:

Figure 1 is a perspective view of the preferred form of my implement. Fig. 2 is an enlarged side elevation thereof. Fig. 3 is an enlarged sectional detail of the hinged side wall of the shovel scoop, and Fig. 4 is an enlarged sectional detail of the front and side portions of the shovel scoop, illustrating the means employed for securing the wire mesh thereto.

Referring now to the drawings 1 indicates a shovel comprising a scoop forming portion 2 and a suitable handle 3, said scoop and handle being secured together, preferably by means of a socket forming portion 4, provided upon, preferably riveted to, the under surface of the scoop 2, said socket forming portion being adapted to receive and securely hold the lower end portion of the handle 3. Said scoop 2 is preferably of the greatest depth at the rearward portion thereof, the same decreasing in depth toward its forward edge 5, the mouth of said scoop being preferably substantially rectangular in shape. Provided at the mouth of said scoop, the same being securely fixed to the upper edge portions of the side walls thereof, preferably by means of a band 6 and rivets 7 passing through said band and the upper edge portion of said scoop, the edge portions of the same resting between said upper edge portion of said scoop and said band, is a preferably wire mesh or screen 8. By such construction a ridge or upwardly extending flange 9 of a width depending upon the width of the band 6 is formed around three of the edges of the scoop, as clearly shown in Fig. 3. Said flange is of any suitable width, the same being provided to prevent the displacement of the sifted particles or residue from the mesh or screen when the implement is in use. The forward edge portion of the mesh 8 is secured to the forward edge 5 of the scoop, preferably by said scoop edge being doubled over said edge portion of said mesh, rivets 10 passing through said scoop edge obviously facilitating a secure connection between said parts. Such construction is clearly shown in Fig. 4 of the accompanying drawings.

In order to facilitate the discharge of the siftings from the scoop, I form the same with a movable side wall 11, the upper edge thereof being hingedly secured as at 12 to the edge portion 13 of the scoop. A coil spring 14 provided upon the edge portion 13 of the scoop, the opposite end portions 15 and 16 thereof respectively resting against the outer surface of said scoop and against said swinging side wall 10 thereof, obviously serves in the capacity of normally holding said side wall in closed position. Rigidly secured, preferably soldered, and upwardly and rearwardly extending from said swinging side wall of the scoop is an arm 17. Having its lower extremity 18 secured to the upper extremity of the arm 17, the same passing through eye screws 19 provided upon the handle 3 for the reception of the same, is a cord 20, preferably of wire. The upper extremity of said cord, which preferably terminates adjacent to the upper grip 21 of the handle 3, is preferably formed into a loop or hand piece to facilitate readily grasping the same. Through the medium of said cord it is obvious that said swinging side wall of the scoop may be opened with the least possible inconvenience or exertion, hence facilitating the ready discharge of the siftings from the scoop.

By the provision of a device of such construction, it is obvious that the removing of the ashes from a furnace or stove or the like and the sifting thereof will be greatly facilitated, such operations being accomplished by but one handling of the ashes.

While I have shown what I deem to be the preferable form of my implement, I do not wish to be limited thereto, as there might be many changes made in the details of construction and arrangement of parts without departing from the spirit of my invention.

Having described my invention what I claim as new and desire to secure by Letters Patent is:

1. A device of the class described, comprising a shovel, the scoop thereof being of gradually increasing depth toward its rearward end portion, a screen arranged upon the upper edge of said scoop, the edge of said scoop, excepting the forward portion thereof, being extended above said screen, the upper edge of one of the side walls of said scoop being hingedly secured to the body thereof, a coiled spring provided upon said scoop adjacent to the upper edge of the hinged wall thereof, said spring being adapted to normally hold said hinged side wall in closed position, an arm upwardly and rearwardly projecting from said hinged side wall, and a cord in operative connection with said arm whereby said swinging side wall may be actuated from the upper extremity of the shovel handle, substantially as described.

2. A device of the class described, comprising a shovel, the scoop thereof being of gradually increasing depth toward its rearward end portion, a screen arranged upon the upper edge of said scoop, the edge of said screen resting between the upper edge portion of the walls of said scoop and a band riveted to the latter, the edge of said scoop, excepting the forward portion thereof, being extended above said screen, one of the side walls of said scoop being hingedly secured at its upper edge to the body thereof, spring means adapted to normally hold said hinged wall in closed position, an arm upwardly and rearwardly projecting from the rearward upper portion of said swinging side wall, a cord secured to the upper end of said arm, and eye screws provided upon the shovel handle through which said cord is adapted to pass to the upper extremity of said shovel handle, substantially as and for the purpose specified.

3. A shovel of the character described comprising a handle, and a scoop portion carried thereby, the latter having bottom, back and side walls, a screen secured thereto inclining from the forward bottom edge of the shovel upwardly and rearwardly to provide a space between the screen and the bottom, and a hinge connection for one of the side walls permitting the same to open to discharge sifted material from the side of the shovel when the same is tilted laterally.

4. A shovel of the character described comprising a handle, and a scoop portion carried thereby, the latter having bottom, back and side walls, a screen secured thereto inclining from the forward bottom edge of the shovel upwardly and rearwardly to provide a space between the screen and the bottom, and a hinge connection for the upper edge of one of the side walls permitting the same to swing away from the bottom to discharge sifted material from the side of the shovel when the same is tilted laterally.

In testimony whereof I have signed my name to this specification in the presence of two subscribing witnesses.

LOUIS H. CHAMBERLIN.

Witnesses:
   Joshua R. H. Potts,
   Helen F. Lillis.